United States Patent [19]

Kaneko

[11] Patent Number: 5,176,336

[45] Date of Patent: Jan. 5, 1993

[54] DRAG MECHANISM FOR FISHING REEL

[75] Inventor: Kyoichi Kaneko, Tokyo, Japan

[73] Assignee: Daiwa Seiko, Inc., Tokyo, Japan

[21] Appl. No.: 643,050

[22] Filed: Jan. 18, 1991

[30] Foreign Application Priority Data

Jan. 19, 1990 [JP] Japan .................. 2-3095[U]
Jan. 19, 1990 [JP] Japan .................. 2-3096[U]
Feb. 2, 1990 [JP] Japan .................. 2-8941[U]

[51] Int. Cl.⁵ .................................. A01K 89/02
[52] U.S. Cl. .................................. 242/264
[58] Field of Search .............. 242/264, 269, 268, 267, 242/245, 246, 244, 302; 464/45, 46, 47

[56] References Cited

U.S. PATENT DOCUMENTS

| | | | |
|---|---|---|---|
| 4,223,854 | 9/1980 | Karlsson | 242/269 X |
| 4,513,925 | 4/1985 | Yamaguchi | 242/245 |
| 4,524,923 | 6/1985 | Tunoda et al. | 242/245 |
| 4,591,108 | 5/1986 | Ban | 242/245 |
| 4,702,431 | 10/1987 | Kaneko | 242/245 X |
| 5,035,374 | 7/1991 | Kaneko | 242/264 |
| 5,037,039 | 8/1991 | Toda | 242/268 X |

Primary Examiner—Daniel P. Stodola
Assistant Examiner—Tony A. Gayoso
Attorney, Agent, or Firm—Longacre & White

[57] ABSTRACT

A drag mechanism for a fishing reel, comprising a rotor for applying a tension to a fishing line, rotatably supported on a support shaft of a reel body. A support cylinder is slidably fitted on and supported by the support shaft and braking plates are mounted around the support cylinder for frictionally connecting the rotor to the support cylinder. The braking plates are piled on the support cylinder in a predetermined number and prevented from falling off of the support cylinder. A manipulator for depressing the braking plates is mounted on the support cylinder, and is threadingly engaged with the support shaft. The support cylinder and braking plates comprise an integral unit removably attached onto the support shaft.

19 Claims, 10 Drawing Sheets

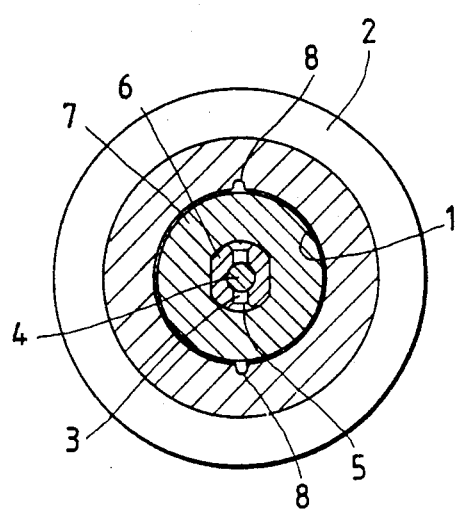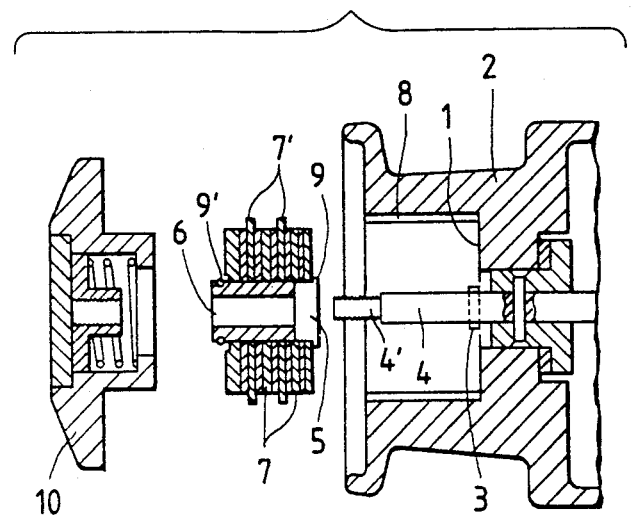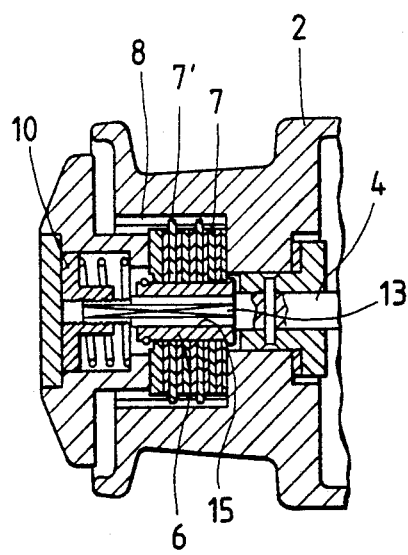

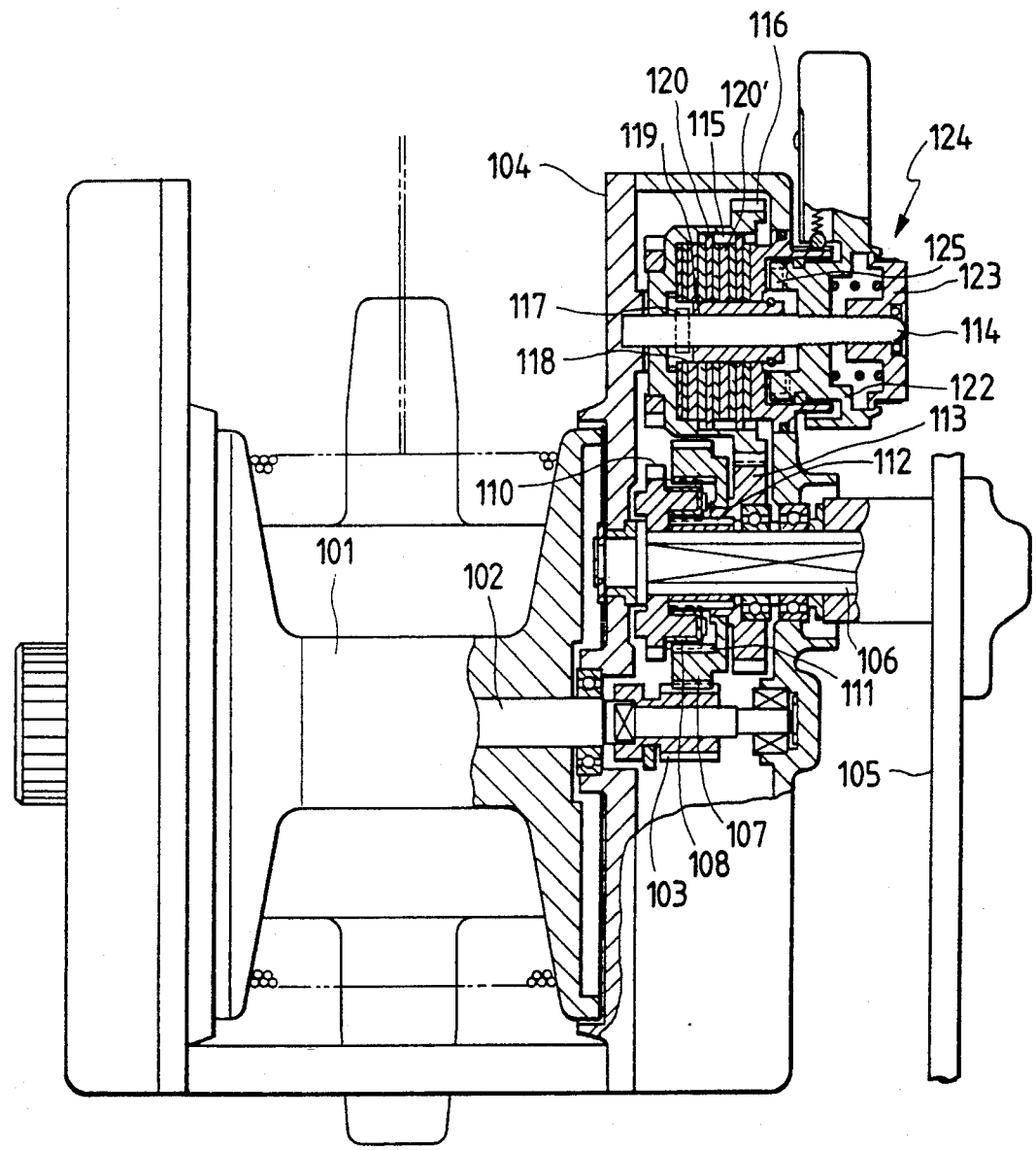

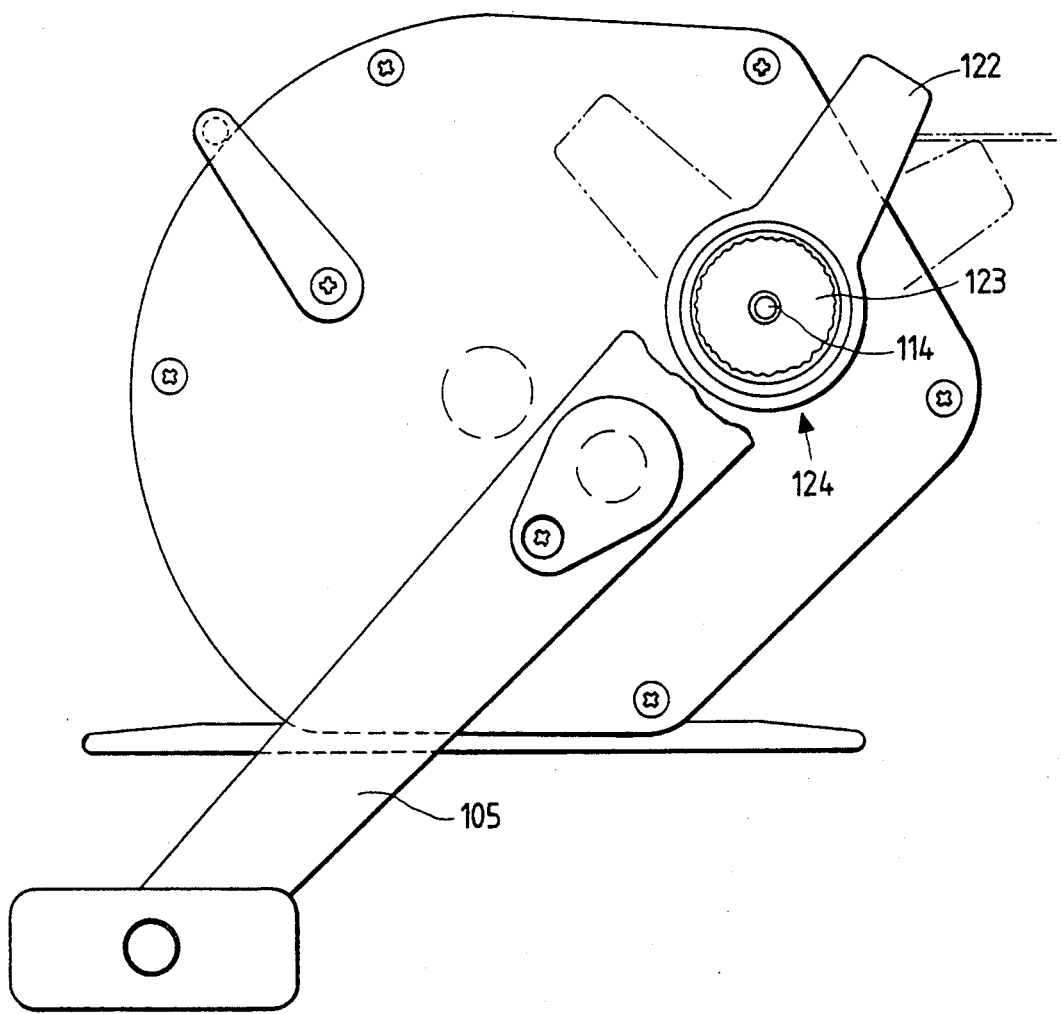

DRAG MECHANISM FOR FISHING REEL

BACKGROUND OF THE INVENTION

1. Field of the Invention

The present invention relates to a drag mechanism for a fishing reel and, more particularly, to a drag mechanism in which braking plates for braking a rotation of a spool are easily exchanged for new ones.

2. Description of the Prior Art

Conventionally, there exists drag mechanisms for fishing reels in which drag force producing members, i.e. braking members, can be exchanged for new ones.

For example, the Japanese Utility Model Publication No. Sho. 55-17824 discloses a drag mechanism for a spinning reel, having a casing for accommodating the braking plates therein. The casing accommodating the braking plates therein can be fitted in a recess portion formed in an intermediate portion of a spool and can be engaged therewith so as to prevent the casing from being rotated relative to the spool and to allow the casing to be removed from the recess portion.

The Japanese Utility Model Publication No. Sho. 57-56710 also discloses a drag mechanism for a fishing reel the spool shaft of which is supported at both ends. The drag mechanism has a support cylinder for accommodating braking plates. The support cylinder is integrally formed on a periphery of a drive gear wheel meshed with a pinion provided on a spool so that the support cylinder extends from the periphery, and a ring-shaped reception member through which an open end of the support cylinder is supported on a outer side plate so that the support cylinder is rotatable. Due to this arrangement, the braking plates can be removed from the fishing reel together with the support cylinder integrally formed on the drive gear wheel, and a handle shaft supporting the drive gear wheel, when the braking plates are to be exchanged.

The prior art mentioned above, however, has some problems.

In the former case, the casing is inserted in the recess portion with accommodating the braking plates therein, so that the casing is interposed between the braking plates and the recess portion. Therefore, it is necessary to manufacture the braking plates with reduced diameter. As a result, the braking force caused by the braking plates is undesirably reduced. Further, when the braking plates are exchanged, the braking plates are detached from and attached onto the recess portion and a spool shaft in a state that the braking plates are accommodated in the casing, so that if non-circular holes formed on some braking plates, which are to be securely fixed on a spool shaft so as to prevent a rotation relative to the spool shaft, are shifted out of place, it is difficult to insert the spool shaft into the holes. Therefore, the casing accommodating the braking plates cannot be easily mounted on the spool shaft.

In the latter case, since the support cylinder accommodating the braking plates therein is integrally formed on the drive gear wheel, the drive gear wheel must be attached to and detached from the fishing reel when the braking plates are exchanged. Therefore, teeth of the pinion and the drive gear wheel are damaged and the foreign matter is adhered onto the tooth surfaces thereof when the braking plates are exchanged. As a result, the meshing relationship between the drive gear wheel and the pinion is deteriorated.

SUMMARY OF THE INVENTION

Accordingly, it is an object of the present invention to provide a drag mechanism for a fishing reel, in which braking plates can be easily, rapidly attached to and detached from the fishing reel and the drag braking force caused by the braking plates is not be reduced.

It is another object of the present invention to provide a drag mechanism for a fishing reel in which the braking plate can be attached to and detached from the fishing reel in a state that the gear wheels retain their mesh.

In order to attain the above noted and other objects, the present invention provides a drag mechanism for a fishing reel, comprising a rotor for applying a tension to a fishing line, rotatably supported on a support shaft of a reel body, a support cylinder slidably fitted on and supported on the support shaft, braking plates mounted around the support cylinder for frictionally connecting the rotor to the support cylinder, the braking plates being piled in a predetermined number and prevented from falling off the support cylinder, and a manipulator for depressing the braking plates mounted on the support cylinder, threadingly engaged with the support shaft, wherein the support cylinder and the braking plates comprise an integral unit removably attached to the support shaft.

In the present invention, the rotor may be rotatably supported on any one of a spool shaft, a drive shaft or a shaft newly provided on the reel body.

Further, the present invention can be applied to both a spinning reel and a reel wherein the spool shaft is supported at both ends.

BRIEF DESCRIPTION OF THE DRAWINGS

In the accompanying drawings:

FIG. 2 is a cross-sectional view taken along a line A—A in FIG. 1;

FIG. 3 is a longitudinally sectioned elevational view showing the drag mechanism in an exploded state wherein a manipulator and a support cylinder is removed form a support shaft;

FIG. 4 is a longitudinally sectioned elevational view showing a modified one of the fishing reel according to a first embodiment of the present invention;

FIG. 5 is a partially sectioned plan view showing a drag mechanism for a fishing reel according to a second embodiment of the present invention;

FIG. 6 is a side view showing the drag mechanism shown in FIG. 5;

DETAILED DESCRIPTION OF THE PREFERRED EMBODIMENTS

Preferred embodiments of the present invention will now be described with reference to the accompanying drawings.

Figure 1:
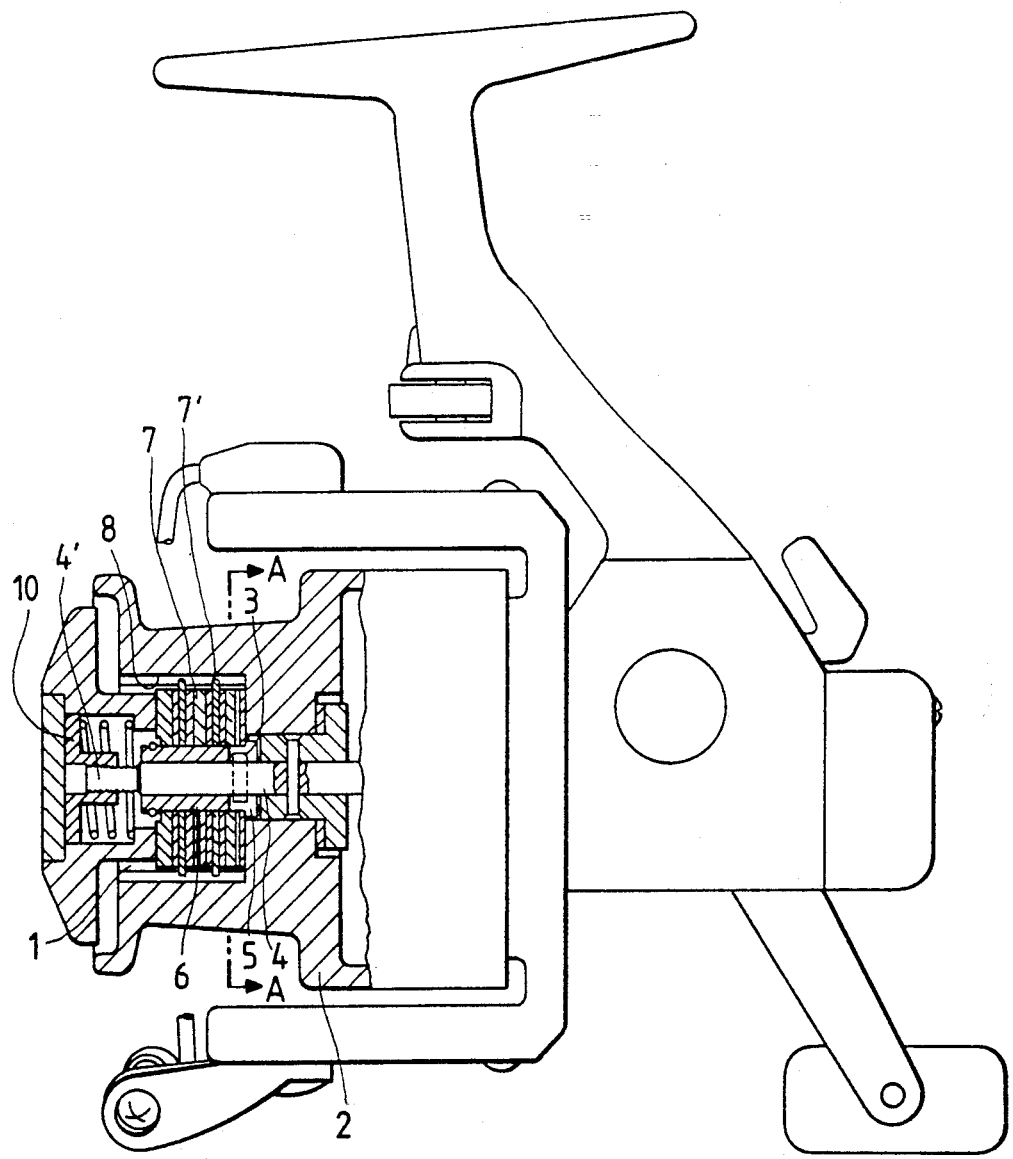
FIG. 1 is a partially sectioned elevational view showing a drag mechanism for a fishing reel according to a first embodiment of the present invention.
Figure 7:
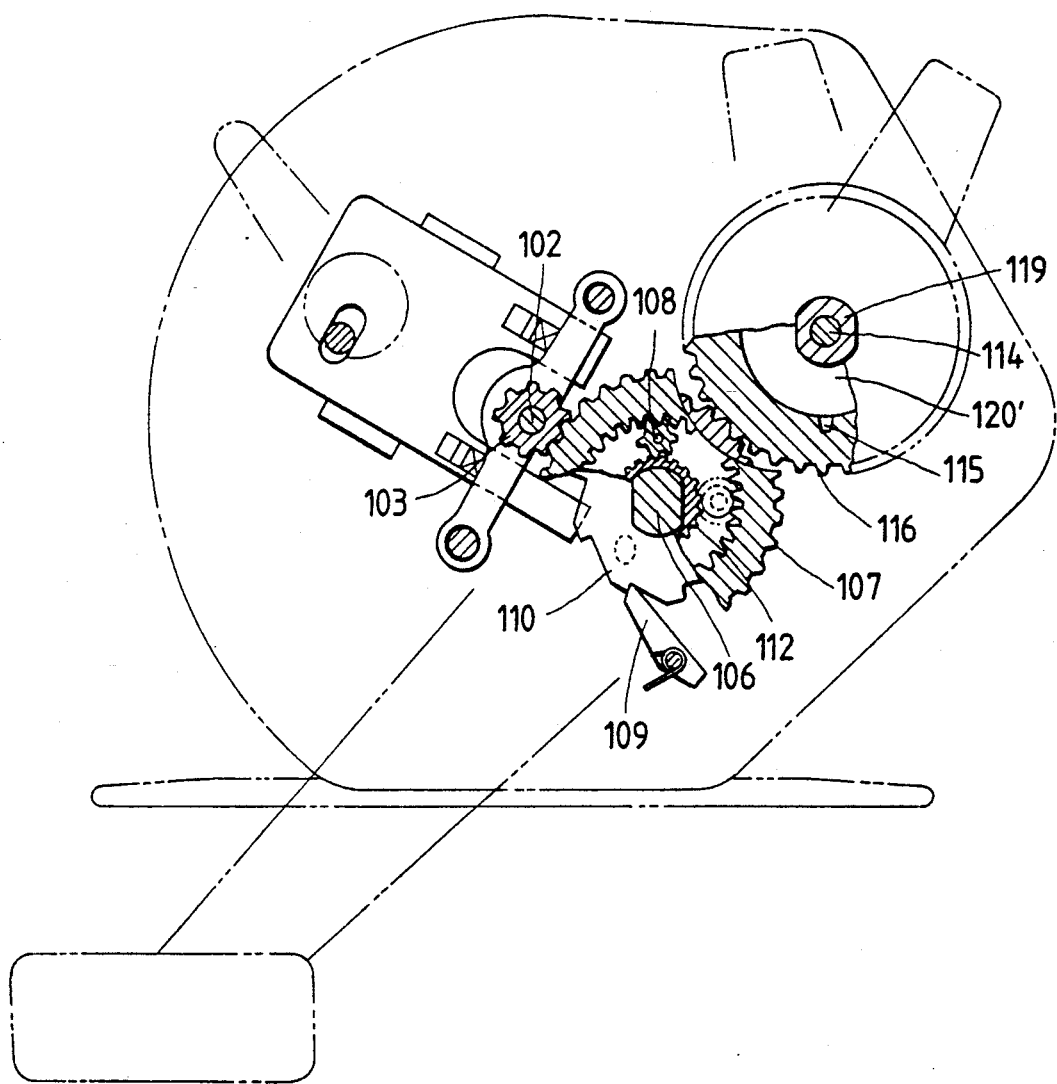
FIG. 7 is a side view with major parts sectioned, which shows the drag mechanism shown in FIG. 5.
Figure 8:
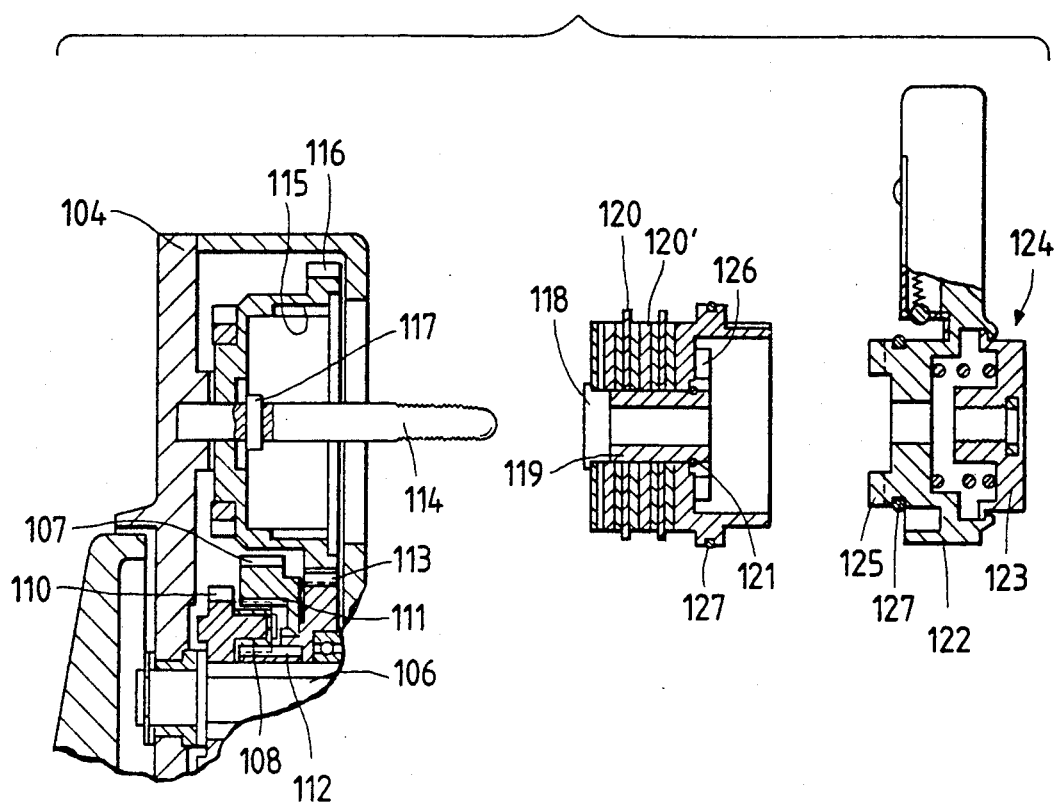
FIG. 8 is an exploded cross sectional view showing the drag mechanism in FIG. 5 in a state that the braking plates are to be exchanged.
Figure 9:
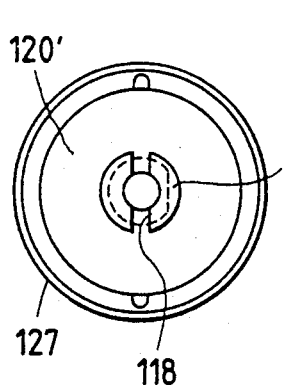
FIG. 9 is a left side view showing a unit including a support cylinder and braking plates, which is shown in FIG. 8.
Figure 10:
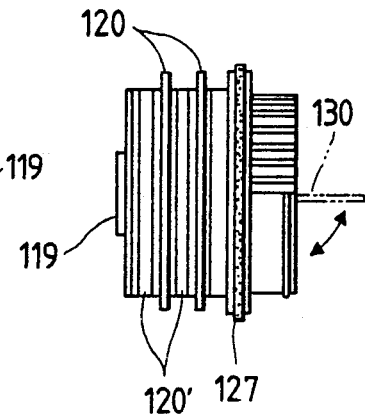
FIG. 10 is a right side view showing the unit in FIG. 8.
Figure 11:
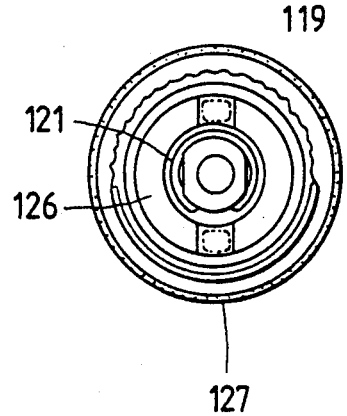
FIG. 11 is a front view showing the unit in FIG. 8.

FIGS. 1, 2 and 3 show a drag mechanism for a fishing reel according to a first embodiment of the present invention.

In the drag mechanism, a spool 2 is rotatably fitted around a spool shaft 4 and formed at a front portion thereof with a recess portion 1. The spool shaft 4 has a pin 3 projecting therefrom. A support cylinder 6 having a notched circular shape in its outer surface is fitted around the spool shaft 4 in such a manner that the pin 3 of the shaft 4 is engaged with an engagement hole 5 formed at an inner surface of the support cylinder 6, so that the support cylinder 6 is movable in the axial direction of the shaft 6 and is prevented from rotating relative to the shaft 6.

A plurality of braking plates 7 and 7' are put one upon another and fitted or mounted around the outer surface of the support cylinder 6. The braking plates 7 are engaged with the support cylinder 6 and the braking plates 7' are engaged with engagement grooves 8 formed on the wall of the recess portion 1, which extend in the axial direction of the spool 2. In this instance, the braking plates 7' are engaged with a rotor built into the spool 2. Alternative rotors frictionally cooperating with the support cylinder through the braking plates are shown in other figures. The braking plates 7 and 7' are prevented by a step portion 9 and a stop ring 9' from falling off from the support cylinder 6. The spool shaft 4 is provided at its front end portion with a threaded portion 4' so that a manipulator 10, which depresses the most outer one of the braking plates and which controls a drag force by its movement along the axis of the spool shaft, is threadingly engaged with the threaded portion 4'.

Accordingly, when the braking plates 7 and 7' are to be exchanged, the support cylinder 6 with the braking plates 7 and 7' can be exchanged as one unit after the manipulator 10 is detached from the shaft 4.

FIG. 4 shows a modified one of the first embodiment of the present invention, in which the spool shaft 4 has at its outer surface a non-circular portion 13 which is in the form of a notched circle in cross section and the support cylinder 6 has at its inner surface an engagement portion 15 which is engageable with the non-circular portion 13, thereby restricting the rotation of the support cylinder 6 relative to the spool shaft 4 and allowing the sliding movement of the support cylinder 6 in the axial direction of the spool shaft 4.

According to the first embodiment of the present invention, the braking plates are mounted on the outer surface of the support cylinder which is slidingly removable from the spool shaft and can be fixed thereto with preventing its rotation relative to the spool shaft and further the braking plates are prevented from falling off from the support cylinder, so that the support cylinder and the braking plates can be a unit construction and the unit can be detached from and attached to the spool shaft and the recess portion when the braking plates are exchanged. As a result, it is possible to reduce the operation in which a plurality of fitting holes formed in the braking plates to be fixed to the spool shaft must be correctly positioned so as to engage the holes with the shaft. Thus, the exchange operation of the braking plates can be rapidly, easily performed. Further, since the diameter of the braking plates is not restricted by the size of the casing as is in the conventional device, the present invention can solve the problem in which the braking force is undesirably lowered due to the reduced diameter of the braking plate. Accordingly, in the present invention, sufficient braking force is effected without increasing the spool in size.

FIGS. 5 to 11 shows a drag mechanism for a fishing reel according to a second embodiment of the present invention.

In the drag mechanism, a spool shaft 102 having a spool 101 is engaged with and disengaged from a pinion 103 by a conventional clutch mechanism device. The pinion 103 is meshed with a driving gear wheel 107 rotatably fitted on a drive shaft 106 which is supported to a reel body 104 and provided with a handle 105.

A claw wheel 110 is securely, integrally fixed to the drive shaft 106. A claw 109 is engaged with a claw of the claw wheel 110 for preventing the reverse rotation of the drive shaft 106. Planet gear wheels 108 are axially supported on the claw wheel 110. The planet gear wheels are meshed at their outer portions with an internal gear wheel 111 formed on an inner surface of a drive gear wheel 107 and at their inner portions with a sun gear wheel 112 rotatably fitted around the drive shaft 106. The sun gear wheel 112 is formed integrally with an associated drive gear wheel 113.

A support shaft 114 is secured to the reel body 104 so as to project therefrom to a right hand side in FIG. 5. A braking gear wheel 116 is rotatably supported to the support shaft 114. The braking gear wheel 116 is formed at its inner cylindrical portion with engagement grooves 115 and is meshed with the associated drive gear wheel 113. A pin 117 projects from the support shaft 114. A support cylinder 119 is fitted around the support shaft 114 in such a manner that the support cylinder 119 is slidably movable along the support shaft. The pin 117 of the support shaft 114 is engaged with an engagement hole 118 formed in the support cylinder 119 so as to prevent the rotation of the support cylinder 119 relative to the support shaft 114.

A plurality of braking plates 120 and 120' are put one upon another and fitted or mounted around the outer surface of the support cylinder 119. The braking plates 120 are engaged with the engagement grooves 115 of the braking gear wheel 116 and the braking plates 120' are engaged with the support cylinder 119. Outside of the braking plates 120 and 120', a manipulating member 124 is provided including a lever manipulator 122 fitted around the support shaft 114 and a micro adjusting knob 123 threadingly engaged with the support shaft 114. For controlling the braking force for braking the braking gear wheel 116 depressing force, which is applied from an inner engagement piece 125 of the lever manipulator 122 onto a cam surface 126 formed on the outermost one of the braking plates 120', is controlled by rotating the lever manipulator.

In addition, numerical reference 127 designates an O-ring for attaining a water-sealing purpose and dust-sealing purpose and 130 designates a pull.

In the drag mechanism constructed according to the second embodiment, when the drive shaft 106, the reverse rotation of which is prevented by engaging the claw 109 with the claw of the claw wheel 110, is rotated for winding a fishing line, the winding rotation of the drive shaft 106 is transmitted through the planet gear system to the drive gear wheel 107 and further transmitted through the pinion 103 to the spool shaft 102 to cause a rotation of the spool 101 for winding a fishing line. On the contrary, when the drive gear wheel 107 is rotated in the reverse direction due to the reverse rotation of the spool 101, the reverse rotation of the drive gear wheel 107 is braked by the braking plates 120 and 120' in such a manner that a frictional force acting on the braking gear wheel 116 is transmitted through the associated gear wheel 113 and the planet gear system to the drive gear wheel 107. Thus, the frictional force, i.e. a drag force is effected onto the spool 101. Accordingly, due to the provision of the planet gear system, the drag performance is effected not only in the reverse rotation but also in the winding rotation so that a spool 101 is in the drag slip state.

When it is necessary to exchange the braking plates 120 and 120' for new ones due to the wear thereof, the micro adjusting knob 123 and the lever manipulator 122 are detached from the support shaft 114, the support cylinder 119 mounting the braking plates 120 and 120' thereon is slidingly removed from the support shaft 119, another support cylinder 119 mounting new braking plates 120 and 120' thereon is fitted on the support cylinder 119, the engagement hole 118 of the support cylinder 119 is engaged with the pin 117 of the support shaft 114 for preventing the rotation thereof relative to the support shaft 114 and then the lever manipulator 122 and the micro adjusting knob 123 is attached to the support cylinder 114.

Figure 12:
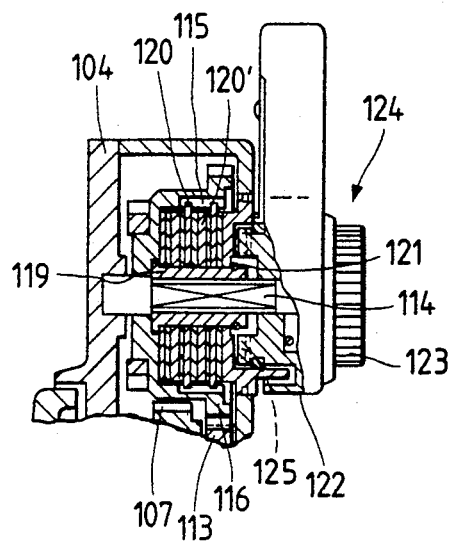
FIG. 12 is a partially sectioned front view showing a modified one of the drag mechanism according to the second embodiment.

FIG. 12 shows a modified one of the drag mechanism according to the second embodiment, in which both fitting surfaces of the support shaft 114 and the support cylinder 119 are in the form of none-circular shapes, i.e. a notched circle in cross section so that the rotation of the support cylinder 119 relative to the support shaft 114 is prevented when the former is fitted on the latter in place.

Figure 13:
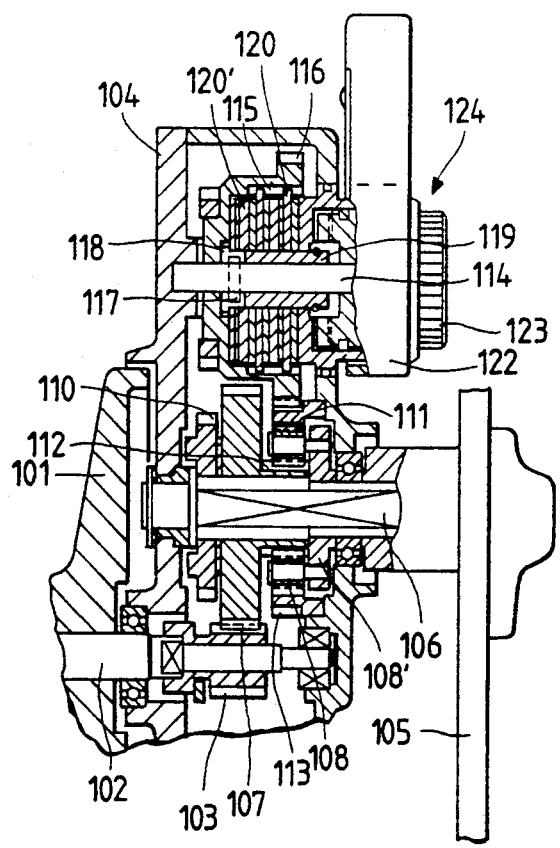
FIG. 13 is a partially sectioned front view showing another modified one of the drag mechanism according to the second embodiment of the present invention.

FIG. 13 shows another modified one of the drag mechanism according to the second embodiment of the present invention, in which the outer peripheral portion of a ring gear wheel which is formed at its inner cylindrical portion with the internal toothed gear wheel 111 is utilized as the associated gear wheel 113 meshed with the braking gear wheel 116. The planet gear wheels 108 are axially supported on a planet carrier 108' securely fixed to the drive shaft 106 for rotating together with the drive shaft 106. The sun gear wheel 112 is formed integrally with the drive gear wheel 107.

Figure 14:
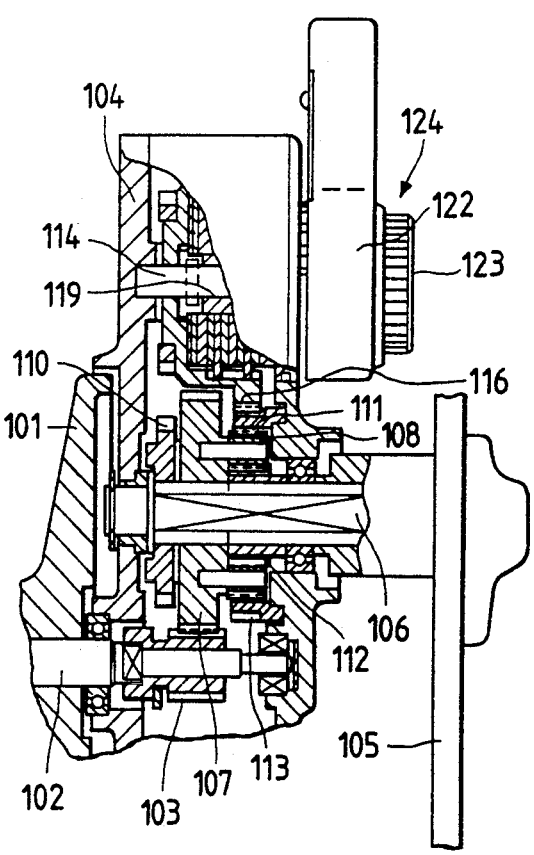
FIG. 14 is a partially sectioned front view showing yet another modified one of the drag mechanism according to the second embodiment of the present invention.

FIG. 14 shows yet another modified one of the drag mechanism according to the second embodiment of the present invention, in which the outer peripheral portion of a ring gear wheel which is formed at its inner cylindrical portion with the internal toothed gear wheel 111 is utilized as the associated gear wheel 113, the planet gear wheels 108 are axially supported on the drive gear wheel 107 and the sun gear wheel 112 is rotated together with the drive shaft 106.

According to the second embodiment of the present invention, a drive gear wheel meshed with a pinion provided on a spool shaft is rotatable relative to a drive shaft having a handle and is associated with the drive shaft through a planet gear system, a braking gear wheel meshed with an associated gear wheel provided in the planet gear system is rotatably supported on a support shaft projecting from a reel body, a support cylinder mounting a plurality of piled braking plates for braking the braking gear wheel is fitted on the support shaft in such a manner that the support cylinder is movable in the axial direction of the support shaft and is prevented from rotating relative to the support shaft, a manipulator for depressing the braking plates is threadingly fixed to the outer end portion of the support shaft to allow its movement along the support shaft, and a reverse rotation preventing mechanism is provided on the drive shaft.

With respect to the planet gear mechanism, the following arrangements can be applied to the present invention. In one case, the associated gear wheel is integrally provided on a sun gear wheel which is rotatable relative to the drive shaft and planet gear wheels are axially supported on a claw wheel preventing a reverse rotation so that the associated gear wheel can be rotated in conjunction with the rotation of the drive shaft, and an internal gear wheel is formed on an inner cylindrical surface of the drive gear wheel. In another case, the sun gear wheel is formed integrally with the drive gear wheel, a carrier for planet gear wheels is provided so as to be rotated together with the drive shaft, and the associated gear wheel is formed on the outer periphery of the internal gear wheel. In yet another case, the planet gear wheels are axially supported on the drive gear wheel, the sun gear wheel is integrally provided on the drive shaft, and the associated gear wheel is formed on the outer periphery of the internal gear wheel.

With respect to means for engaging the support cylinder with the support shaft by spline, the support shaft is provided with a pin projecting therefrom and the support cylinder is provided with an engagement hole engaged with the pin. However, the present invention is not restricted to this. For example, in order to fit and engage the support cylinder with the support shaft, it may be applied to the present invention that an outer surface of the support shaft and an inner surface of the support cylinder are in the form of a non-circle in cross section.

In this arrangement, the rotation of the handle is transmitted through the planet gear mechanism to the drive gear wheel so that the spool securely fixed to the spool shaft is rotated by the pinion meshed with the drive gear wheel. The drag braking of the spool is performed in such a manner that the braking gear wheel meshed with associated gear wheel provided in the planet gear mechanism is braked by the braking plates which are depressed by the manipulator. When the braking plates have been worn, the manipulator is detached from the support shaft, the support cylinder mounting the braking plates thereon is removed from the support shaft, and then the braking plates are exchanged for new ones. After that, the support cylinder mounting the braking plates is fitted on the support shaft and the manipulator is threadingly engaged with the support shaft to depress the braking plates, in which the drag braking force is controlled by the depression of the manipulator onto the braking plates.

According to the second embodiment of the present invention, a drag mechanism for a fishing reel is provided on a support shaft which is separated from a spool shaft and a drive shaft having a handle and a drive gear wheel fitted on the drive shaft is rotated through a planet gear system in conjunction with the rotation of the drive shaft, so that not only in the reverse rotation of a spool but also in the rotation for winding a fishing line the drag performance, which is set in advance, is sufficiently effected, thereby securely preventing a fishing line from being cut off when fishing. Further, if the braking plates has worn, the support cylinder mounting the braking plates thereon can be exchanged in a state that the braking gear wheel and the associated gear wheel of the planet gear system are meshed with each other, so that the braking plates can be rapidly, easily exchanged with no affection of the mesh of the gear wheels.

Figure 15:
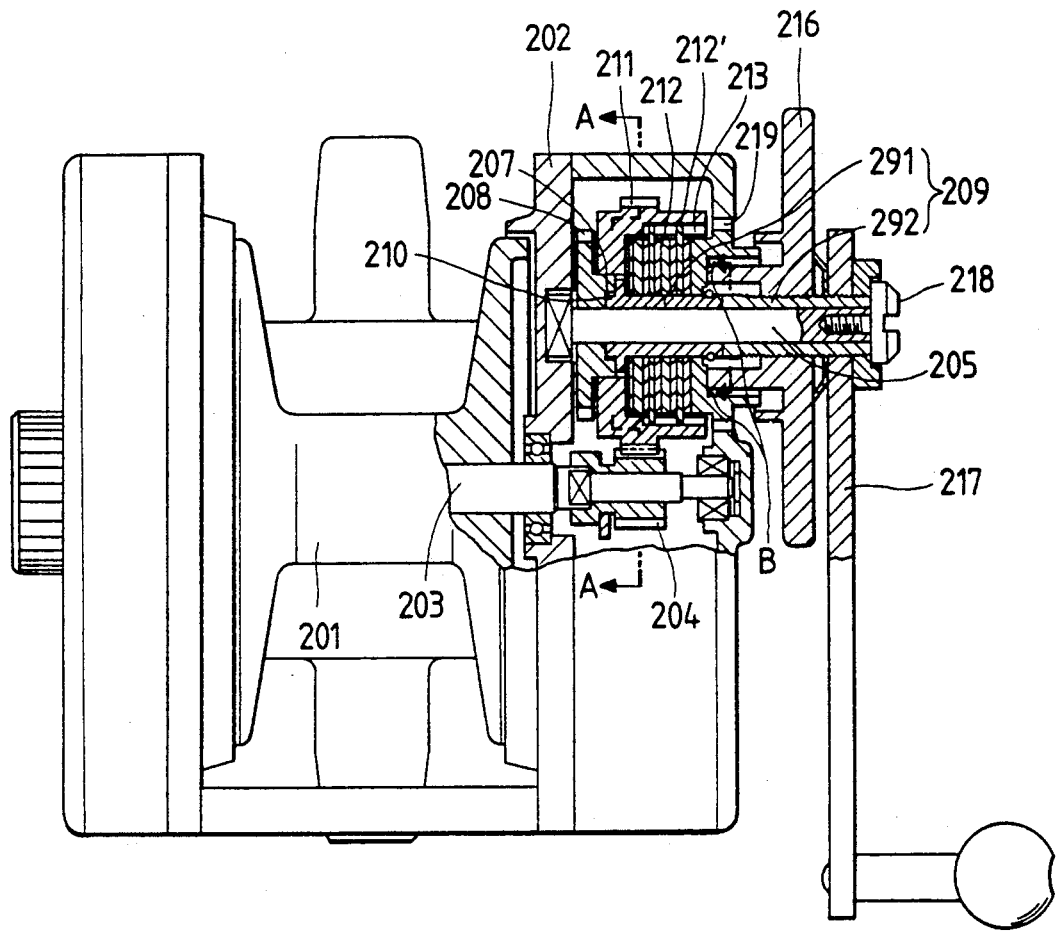
FIG. 15 is a partially sectioned plan view showing a drag mechanism for a fishing reel according to a third embodiment of the present invention.
Figure 16:
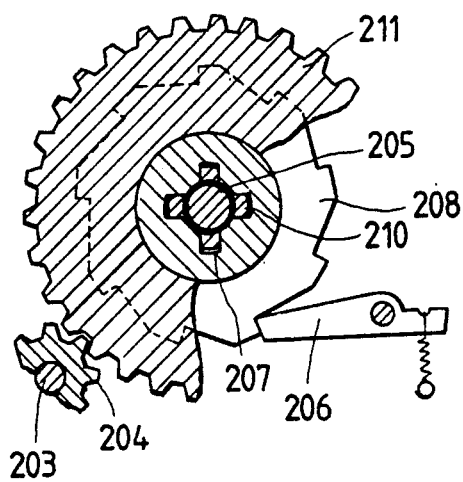
FIG. 16 is a cross-sectional view taken along a line A—A in FIG. 15.
Figure 17:
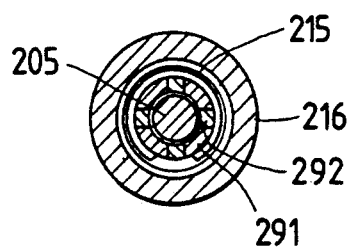
FIG. 17 is a cross-sectional view taken along a line B—B in FIG. 15.
Figure 18:
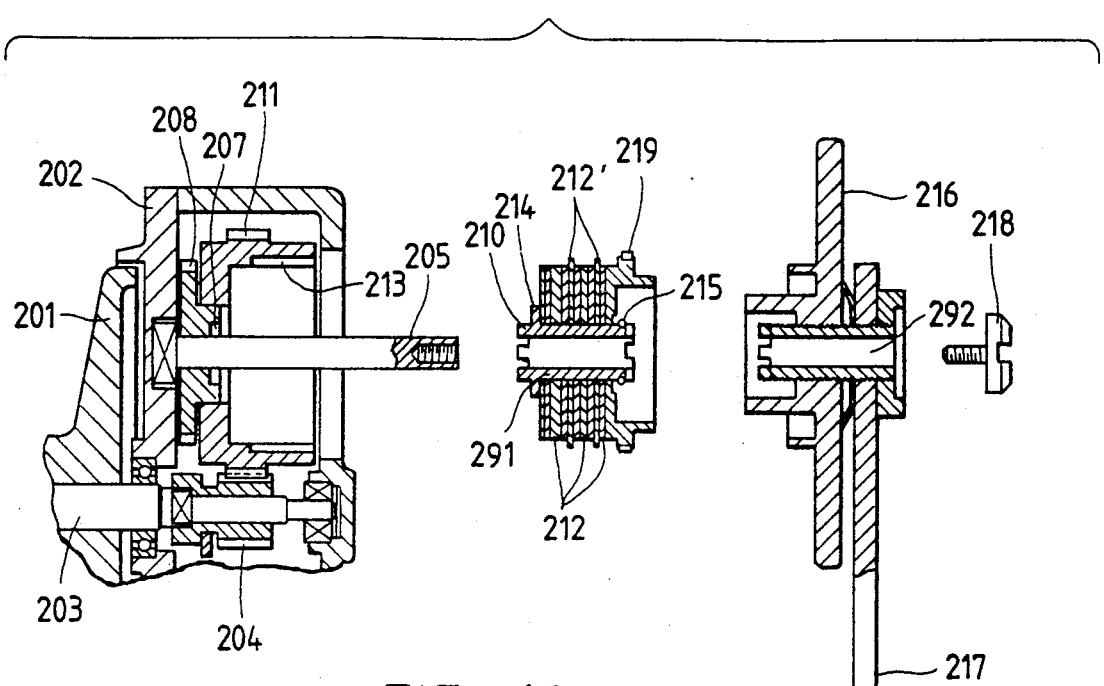
FIG. 18 is an exploded cross-sectional view showing the drag mechanism in FIG. 15 in a state that the braking plates are to be exchanged.

FIGS. 15, 16 and 17 shows a drag mechanism for fishing reel according to a third embodiment of the present invention.

In the drag mechanism, a spool 201 is securely fixed on a spool shaft 203 supported to a reel body 202. The spool shaft 203 is engageable with and disengageable from a pinion 204 as is known from a conventional device. A support shaft 205, which is another shaft separated from the spool shaft 203, is supported to the reel body 202 so as to project therefrom. A reverse rotation preventing claw wheel 208 is rotatably fitted on the support shaft 205 at a proximal end of the support shaft 205. The reverse rotation preventing claw wheel 208 is prevented from rotating in the reverse direction by engaging a claw thereof with a reverse rotation preventing claw 206. The claw wheel 208 is provided at its outer side, i.e. at right hand side in FIG. 15 with an engagement portion 207. A support cylinder 209 comprising first and second support cylinders 291 and 292 is fitted on the support shaft 209. The first and second support cylinders 291 and 292 are engageable with each other so as to prevent mutual rotation and to allow movement in the axial direction of the support shaft 205 supporting the first and second support cylinder 291 and 292 thereon. An engagement portion 210 is provided on an inner end of the first support cylinder 291 so as to be engaged with the engagement portion 207 of the claw wheel 208 for preventing mutual rotation and allowing movement in the axial direction of the support cylinder 205.

A drive gear wheel 211 is rotatably supported on the reverse rotation preventing claw wheel 208. The drive gear wheel is meshed with a pinion 204 A plurality of braking plates 212 and 212' are put one upon another and fitted or mounted around the outer surface of the first support cylinder 291. The braking plates 212 and 212' are prevented by a step portion 214 and a stop ring 215 from falling off from the first support cylinder 291. The braking plates 212 are engaged with the first support cylinder 291 and the braking plates 212' are engaged With the engagement grooves 213 formed on an inner cylindrical surface of the drive gear wheel 211. A manipulator 216 for depressing the braking plates 212 is threadingly fitted on the second support cylinder 292 so that the manipulator 216 is movable along the second support cylinder 292. A handle 217 is fixedly attached to the outer end portion of the second support cylinder 292. A screw 218 is threadingly engaged with the support shaft 205 for preventing the support cylinder 209 from falling off from the support shaft 205. Numerical reference 219 designates a ring for attaining water-sealing and dust-searing purpose.

Figure 19:
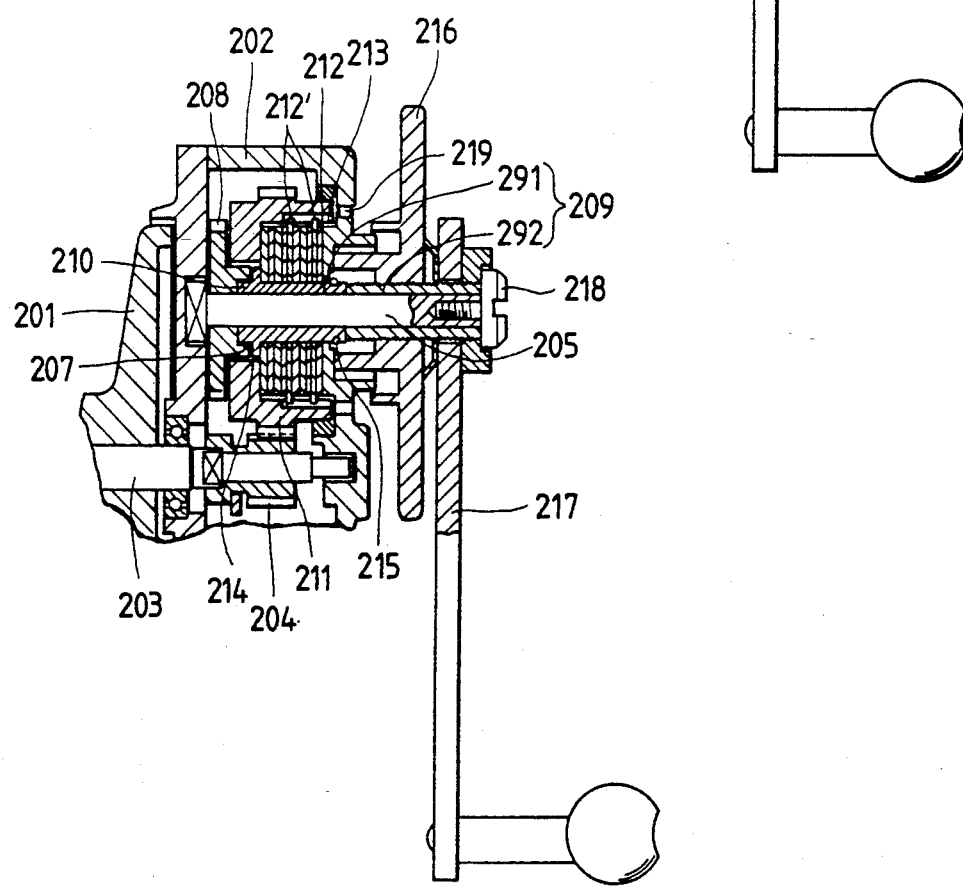
FIG. 19 is a partially sectioned plan view showing a modified one of the drag mechanism according to the third embodiment of the present invention.

FIG. 19 shows a modified one of the drag mechanism according to the third embodiment of the present invention, in which the drive gear wheel is rotatably supported on the reel body 202 instead of the drive gear wheel being supported on the reverse rotation preventing claw wheel 208.

Accordingly, if it is necessary to exchange the braking plates 212 and 212' due to the wear thereof, the second support cylinder 292 together with the manipulator 216 and the handle 217 is removed from the support shaft 205 by unscrewing the screw 18, the first support cylinder 291 together with the braking plates 212 and 212' is removed from the support shaft 205 and the engagement portion 207, and then the braking plates, which has been worn, are exchanged for new ones or a unit of the first support cylinder 291 and the braking plates 212 and 212' is exchanged for new unit. After the exchange, the first support cylinder mounting new braking plates 212 and 212' thereon is inserted on the support shaft 205 so as to engage the engagement portion 210 thereof with the engagement portion 207 of the reverse rotation preventing claw wheel 208, the second support cylinder 292 together with the handle 217 and the manipulator 216 is inserted on the support shaft 205 so as to be engaged With the first support cylinder 291, and then the screw 218 is threadingly engaged with the support shaft 205.

Figure 20:
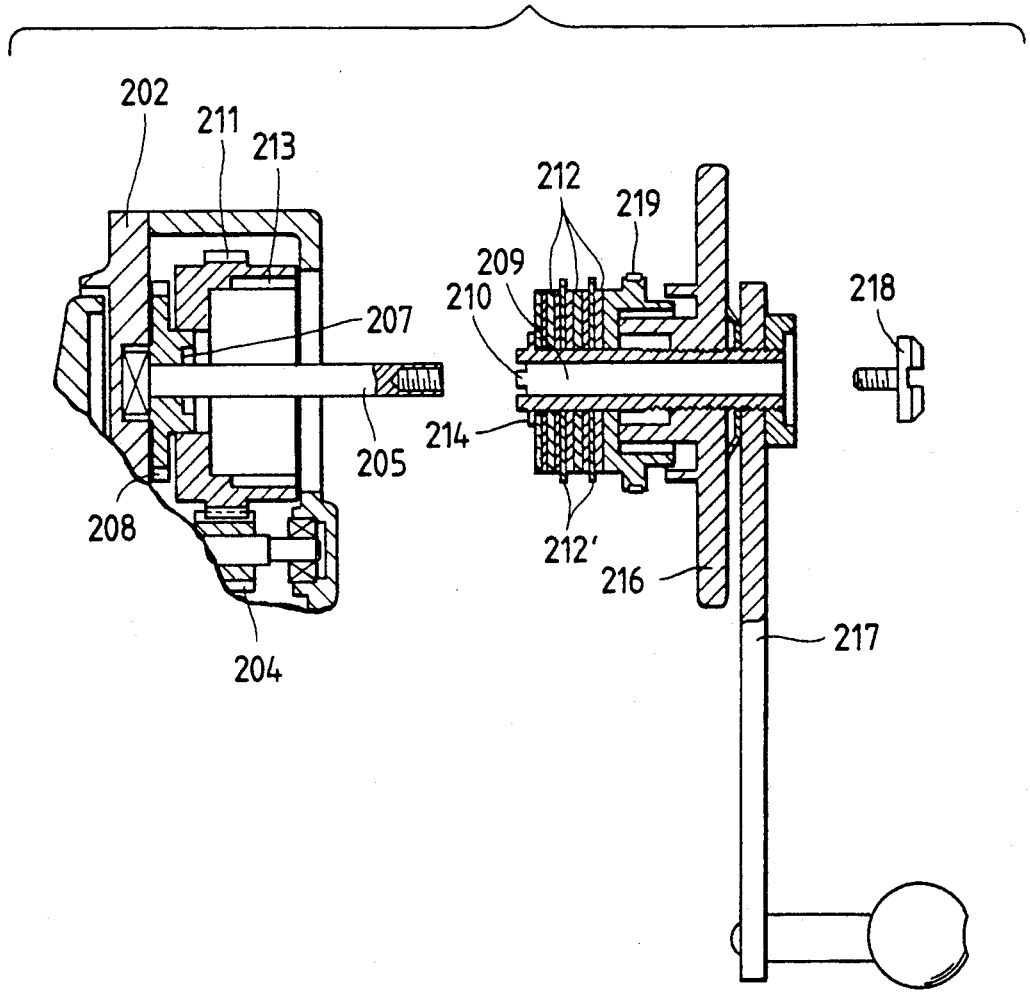
FIG. 20 is an exploded cross-sectional view showing another modified one of the drag mechanism according to the third embodiment of the present invention.

Each of the above-mentioned fishing reels according to the third embodiment of the present invention are provided with the support cylinder which is divided into the first and second support cylinder 212 and 212' for easily performing the exchange work of the braking plates 212 and 212'. However, the present invention is not restricted to this. For example, as shown in FIG. 20, the support cylinder may be constructed as a single integral piece. In this case, the braking plates 212 and 212' can be attached to and detached form the support shaft 205 together with support cylinder 209, the manipulator 216 and the handle 217.

According to the third embodiment of the present invention, a drive gear wheel meshed with a pinion provided on a spool shaft is supported on a reverse rotation preventing claw wheel fitted on the support shaft provided on a reel body, a support cylinder, which is slidingly movable relative to the support shaft and engageable with the reverse rotation preventing claw wheel, is rotatably fitted on the support shaft so that the support cylinder is frictionally coupled with the drive gear wheel by braking plates mounted on the support cylinder, and further, a manipulator is threadingly attached to an outer end portion of the support cylinder so as to depress the braking plates. In addition, the handle is provided on the outer end portion of the support cylinder.

The support cylinder may be formed as a single integral piece by the same material, or otherwise may be formed with first and second support cylinders which are engageable with each other in the axial direction thereof. In the latter arrangement, the first support cylinder is engaged with the claw wheel so as to be disengageable therefrom by the axial movement of the first support cylinder, the braking plates are mounted on the first support cylinder so as to be prevented from falling off therefrom, and the manipulator for depressing the braking plates and the handle are provided on the second support cylinder.

In this arrangement, when the braking plates are exchanged because of the wear thereof, the support cylinder mounting the braking plates, the manipulator and the handle is disengaged from the engagement portion of the reverse rotation preventing claw wheel and removed from the support shaft, the manipulator and the handle are detached from the support cylinder, and then the braking plates are exchanged for new ones. After that, by the opposite steps mentioned above, the support cylinder is fitted on the support shaft so as to be engaged with the engagement portion of the claw wheel. If the support cylinder is divided into the first and second support cylinders, the second support cylinder is detached from the first support cylinder together with the manipulator and the handle, the first support cylinder mounting the braking plates thereon is detached from the claw wheel and removed form the support cylinder, and then, the braking plates are exchanged for new ones. After that, the first support cylinder and the second support cylinder is fitted on the support shaft in this order.

The drive rear wheel meshed with a pinion provided on a spool shaft may be supported on a reel body.

According to the third embodiment of the present invention, in the case where the braking plates for braking the drive gear wheel provided on the support shaft have been worn, the braking plates can be exchanged for new ones by removing the support cylinder mounting the braking plates thereon from the engagement portion of the reverse rotation preventing claw wheel and from the support shaft in a state that the drive gear wheel is supported on the claw wheel or the reel body so as to retain the mesh between the drive gear wheel and the pinion. Due to this arrangement, it is possible to reduce the conventional problems in that the meshing surfaces of the drive gear wheel and the pinion is damaged and the foreign matter is adhered onto the tooth surfaces, and therefore no deterioration occurs in mesh. As a result, it is possible to smoothly and surely perform the exchange work of the braking plates.

While the present invention has been described with respect to the preferred embodiments thereof, the description herein is not intended to limit the scope of the invention except by the following claims.

What is claimed is:

1. A drag mechanism for a fishing reel, comprising:
   a rotor rotatably supported on a support shaft of a reel body for receiving tension acting on a fishing line;
   a support cylinder slidably fitted on and supported by said support shaft;
   braking plates mounted along the length of said support cylinder for frictionally connecting said rotor to said support cylinder, said braking plates being piled onto said support cylinder in a predetermined number, and a plurality of stop means for retaining said braking plates on said support cylinder, said stop means are mounted on said support cylinder at opposite ends of said braking plates; and
   a manipulator for actuating said braking plates and being threadingly engaged with said support shaft, wherein said support cylinder, said plurality of stop means and said braking plates comprise an integral unit removably attached to said support shaft.

2. The drag mechanism according to claim 1, wherein said rotor includes a braking gear wheel rotatable in conjunction with a drive gear wheel provided on a rotor drive shaft.

3. The drag mechanism according to claim 1, wherein said support shaft comprises a drive shaft having a handle, and said rotor comprises a drive gear wheel being rotatable relative to said drive shaft against a frictional force of said braking plates.

4. The drag mechanism according to claim 1, wherein said support shaft comprises a spool shaft rotatable in conjunction with a rotation of a handle, and said rotor is a spool provided on a forward portion of said spool shaft, said spool being rotatable relative to said spool shaft against a frictional force of said braking plates.

5. A drag mechanism for a fishing reel frictionally influencing operation of a handle rotatably supported on a reel body and connected to a spool rotatably supported on the reel body such that said spool is rotated in conjunction with rotation of said handle when tension acting on a fishing line is less than a predetermined frictional force, and said spool is independently rotated with respect to rotation of said handle when the tension acting on the fishing line is more than the predetermined frictional force, thereby allowing the fishing line to be unwound off the spool and preventing the fishing line from breaking, said drag mechanism comprising:
   a shaft projecting from the reel body;
   means for receiving the tension acting on the fishing line, said receiving means including a rotor rotatably and coaxially supported on said shaft;
   a sub unit removably attached to said shaft, including:
      a support cylinder removably fitted on said shaft,
      at least one first braking plate formed with a first hole portion for non-rotatably engaging a peripheral surface of said support cylinder,
      at least one second braking pate formed with a second hole portion for rotatably fitting on the peripheral surface of said support cylinder, and engagement portions on said at least one second braking plate for engaging said rotor, and
      a plurality of stop means for preventing said at least one first braking plate and said at least one second braking plate piled around said support cylinder from falling off from the peripheral surface of said support cylinder, said stop means are mounted on said support cylinder at opposite ends of said piled braking plates;
   means for restrict rotation of said support cylinder relative to rotation of said handle; and
   means for depressing said at least one first braking plate and said at least one second braking plate to cause the predetermined frictional force therebetween, said depressing means being threadingly and adjustably related to said shaft, whereby when the tension acting on the fishing line is more than the predetermined frictional force, said rotor engaged with said at least one second braking plate is independently rotated from said support cylinder engaged with said at least one first braking plate.

6. The drag mechanism according to claim 5, wherein said shaft supports said spool for rotation in conjunction with rotation of said handle when tension acting on the fishing line is less than the predetermined frictional force, said rotor is integral with said spool and coaxially supported on said shaft, said spool being located on a forward portion of said shaft, and including a recess portion having engaging grooves engaged with said engagement portions of said at least one second braking plate.

7. The drag mechanism according to claim 6, wherein said restricting means includes a pin projecting from said shaft and an engagement portion on said support cylinder for engaging said pin when said support cylinder is attached to said spool shaft by said depressing means, said engagement portion being formed in an inner cylinder surface of said support cylinder.

8. The drag mechanism according to claim 6, wherein said restricting means includes a first notched circular portion formed on a circumference of said shaft and a second notched portion on said support cylinder for engaging said first notched circular portion when said support cylinder is retained on said shaft by said depressing means, said second notched circular portion being formed in an inner cylindrical surface of said support cylinder.

9. The drag mechanism according to claim 5, wherein said shaft is securely fixed to said reel body, and said receiving means further including a planet gear train supported on a drive shaft being rotatably supported on the reel body and being securely fixed to said handle.

10. The drag mechanism according to claim 9, wherein said planet gear train includes a planet carrier securely fixed to said drive shaft for rotation in one direction, a sun gear wheel rotatably fitted on said drive shaft, planet gear wheels axially supported on said planet carrier and meshed with said sun gear, an internal gear wheel rotatably supported on said drive shaft and meshed with said planet gear wheels, a drive gear wheel formed on an outer surface of said internal gear wheel and meshed with a pinion rotated in conjunction with said spool, and an associated gear wheel formed integrally with said sun gear and meshed with a braking gear wheel formed on said rotor.

11. The drag mechanism according to claim 9, wherein said planet gear train comprises a planet carrier securely fixed to said drive shaft, a sun gear wheel rotatably supported to said drive shaft, planet gear wheels axially supported on said planet carrier and meshed with said sun gear wheel, an internal gear wheel axially supported on said drive shaft and meshed with said planet gear wheels, a drive gear formed integrally with said sun gear and meshed with a pinion rotated in conjunction with said spool, and an associated gear wheel formed on an outer surface of said internal gear wheel and meshed with a braking gear wheel formed on said rotor.

12. The drag mechanism according to claim 9, wherein said planet gear train comprises a sun gear securely fixed to said drive shaft, a drive gear rotatably supported to said drive shaft and meshed with a pinion rotated in conjunction with said spool, planet gear wheels axially supported on said drive gear wheel and meshed with said sun gear wheel, an internal gear wheel axially supported on said drive shaft and meshed with said planet gear wheels, and an associated gear wheel formed on an outer surface of said internal gear wheel and meshed with a braking wheel formed on said rotor.

13. The drag mechanism according to claim 9, wherein said rotor is a cup-shaped member formed on an inner cylindrical surface thereof with engaging grooves engaged with said engagement portions and at an outer periphery thereof including a braking gear wheel, wherein one gear of said planet gear train is meshed with said braking gear wheel so that said predetermined frictional force prevents rotation of said rotor.

14. The drag mechanism according to claim 9, wherein said restricting means includes a pin projecting from said shaft and an engagement portion on said support cylinder for engaging said pin when said support cylinder is retained on said shaft by said depressing means, said engagement portion being formed in an inner cylindrical surface of said support cylinder.

15. The drag mechanism according to claim 9, wherein said restricting means includes a first notched circular portion formed on a circumference of said shaft and a second notched portion on said support cylinder for engaging said first notched circular portion when said support cylinder is retained on said shaft by said depressing means, said second notched circular portion being formed in an inner cylindrical surface of said support cylinder.

16. The drag mechanism according to claim 5, further comprising a claw wheel rotatably supported on said shaft and rotated in one direction and wherein said restricting means includes a first engagement portion formed on said claw wheel and a second engagement portion formed on an end portion of said support cylinder and engaged with said first engagement portion for preventing mutual rotation of said claw wheel and said support cylinder when said support cylinder is retained on said shaft by said depressing means.

17. The drag mechanism according to claim 16, wherein said depressing means includes a cylindrical member onto which said handle is securely fixed, said cylindrical member being rotatably fitted on said shaft, a depressing member threadingly attached to said cylindrical member for depressing said first and second braking plates, and a screw for threadingly attaching said cylindrical member to said shaft.

18. The drag mechanism according to claim 17, further comprising means for engaging said support cylinder with said cylindrical member.

19. The drag mechanism according to claim 17, wherein said cylindrical member is formed integrally with said support cylinder.

* * * * *